(12) United States Patent
Day

(10) Patent No.: US 6,278,168 B1
(45) Date of Patent: Aug. 21, 2001

(54) THERMO-OPTIC SEMICONDUCTOR DEVICE

(75) Inventor: Ian Edward Day, Old Headington (GB)

(73) Assignee: Bookham Technology PLC (GB)

( * ) Notice: Subject to any disclaimer, the term of this patent is extended or adjusted under 35 U.S.C. 154(b) by 0 days.

(21) Appl. No.: 09/349,038

(22) Filed: Jul. 7, 1999

(30) Foreign Application Priority Data

Jul. 17, 1998 (GB) .................................................. 9815655

(51) Int. Cl.[7] .................................................. H01L 27/14
(52) U.S. Cl. .......................... 257/431; 257/432; 257/436; 257/526; 257/536; 257/537; 257/538; 359/248; 359/288; 359/289; 359/385
(58) Field of Search .................................. 257/238, 240, 257/248, 276, 279, 288, 289, 358, 360, 363, 380, 516, 536, 537, 904; 359/248, 288, 289, 385; 219/358, 552, 555

(56) References Cited

FOREIGN PATENT DOCUMENTS 2 269 678   2/1994 (GB) .
2 320 104   6/1998 (GB) .

OTHER PUBLICATIONS

International Search Report re PCT application No. PCT/GB99/02016, dated Sep. 13, 1999.
Cocorullo, G. et al, "Silicon Thermooptical Micromodulator with 700–kHz –3–dB Bandwith," *IEEE Photonics Technology Letters*, vol. 7, No. 4, pp. 363–365, Apr., 1995.
Cutolo, A. et al, "Silicon Electro–Optic Modulator Based on a Three Terminal Device Integrated in a Low–Loss Single–Mode SOI Waveguide," *Journal of Lightwave Technology*, vol. 15, No. 3, pp. 505–518, Mar., 1997.
U.K. Search Report for patent application No. GB 9815655.7 dated Oct. 28, 1998.

Primary Examiner—Olik Chaudhuri
Assistant Examiner—Wai-Sing Louie
(74) Attorney, Agent, or Firm—Cook, Alex, McFarron, Manzo, Cummings & Mehler, Ltd.

(57) ABSTRACT

A thermo-optic semiconductor device has one semiconductor region providing an optical waveguide and an adjacent semiconductor region providing a resistive heater between two doped regions, current may be passed through the resistive heater within the adjacent semiconductor region to heat it and thereby vary the optical characteristics of the waveguide.

10 Claims, 2 Drawing Sheets

THERMO-OPTIC SEMICONDUCTOR DEVICE

The invention relates to thermo-optic semiconductor devices having optical characteristics which may be changed by resistive heating.

BACKGROUND OF THE INVENTION

Semiconductors have been used in optical transmission devices. For example, silicon has been used in integrated silicon chip devices. Such devices may include silicon waveguides formed as an integrated circuit on a silicon dioxide layer supported by a silicon substrate. It is known that silicon exhibits a refractive index varying with temperature. It exhibits a refractive thermal non-linearity $dn/dT=1.86\times10^{-4}K^{-1}$ at a wavelength of 1550 nm. This non-linearity with application of heat has been used to form phase modulators in silicon and silica based waveguide devices by using a thin metal track over the waveguide region to provide a resistive heater.

It is an object of the present invention to provide an improved structure and method for effecting resistive heating in a thermo-optic semiconductor device.

SUMMARY OF THE INVENTION

The invention provides a thermo-optic semiconductor device comprising one semiconductor region providing an optical transmission path and an adjacent semiconductor region providing a resistive heater between two doped regions, said doped regions being in electrical contact with external contact regions so that current may be passed through the resistive heater within the adjacent semiconductor region to heat said one semiconductor region and thereby vary its optical characteristics.

Preferably, said external contact regions comprise metal regions.

Preferably, the device is covered with an electrically insulating layer, and said metal regions are exposed through said insulating layer.

The resistive heater may provide a phase shifter for light transmitted through the transmission path.

In some embodiments, the semiconductor device comprises a semiconductor waveguide providing said optical transmission path, and said adjacent semiconductor region extends across the underside of the waveguide.

Preferably, the semiconductor regions are formed of silicon.

The device may be integrated on a silicon or silicon-on-insulator chip.

The doped regions may each comprise P-typed doped regions within the semiconductor.

The doped regions may each comprise N-typed doped regions within the semiconductor.

The present invention includes a light modulator comprising an optical transmission device for splitting an optical beam and directing part of the optical beam through a thermo-optic semiconductor device as aforesaid to cause a phase variation, and means for recombining the beam to cause amplitude modulation by interference.

The present invention includes a method of varying the optical transmission characteristics of a semiconductor device comprising passing current through part of the semiconductor device between two doped regions of the semiconductor device, thereby generating resistive heat to vary the optical transmission characteristics.

Current may be passed between said doped regions to vary the phase of light transmitted through the device.

The power supply may be modulated to modulate the phase variation.

Said semiconductor device may include a semiconductor waveguide adjacent to the region through which current is passed.

DESCRIPTION OF THE PREFERRED EMBODIMENT

Figure 1:
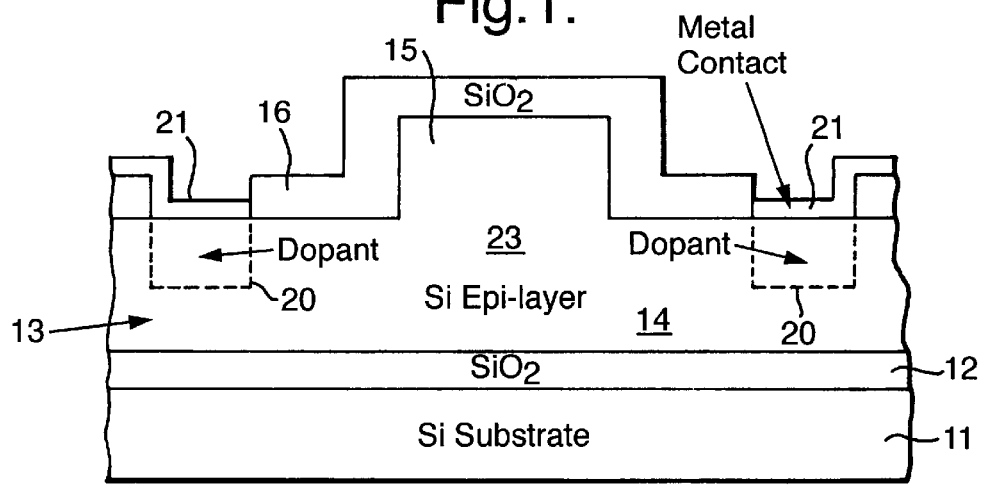
FIG. 1 is a sectional view through a thermo-optic semiconductor device in accordance with the present invention and shows a section taken on the line A—A of FIG. 2.
Figure 2:
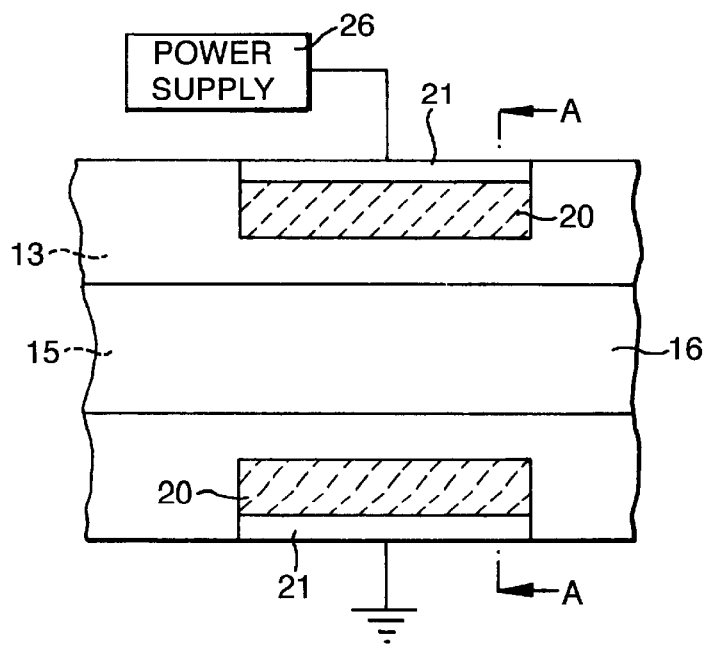
FIG. 2 is a plan view of part of the semiconductor device of FIG. 1.

The embodiment shown in FIG. 1 is a device providing a silicon rib waveguide which is integrated on a silicon-on-insulator chip. The chip comprises a silicon substrate 11 on which is formed an insulating layer 12 of silicon dioxide. Above the layer 12 is a silicon epitaxial layer 13 having a main region 14 above which projects an elongated region 16 providing a waveguide. The silicon layer 13 is generally covered by an electrically insulating silicon dioxide layer 16. In use as a silicon waveguide device, the channel region 15 acts to confine laterally an optical transmission mode which is guided by the elongate region 15 and the main region 14. The main silicon layer extends fully across the width of the region 15 and below it from one side to the other. To make use of the change of refractive index of silicon in the waveguide 15 with change of temperature, a resistive heater is provided below the waveguide 15 within the main silicon layer 14. This resistive heater is formed by two doped regions 20 and 21 formed of similar type of dopant on the two opposite sides of a selected part of the waveguide 15. This is shown in FIG. 2. Each of the doped regions 20 may be formed of a P-type dopant, or they may each be formed of an N-type dopant. In a preferred example, phosphorous is used as the dopant. The dopant may be introduced into the well-type regions 20 by techniques well known in semiconductor manufacture such as diffusion or implantation. Immediately above each of the dopant regions 20, an aperture is formed in the electrically insulating layer 16, and a metal contact region 21 is inserted into the aperture thereby providing an external contact region. The dopant regions 20 are each doped to a concentration level which provides an ohmic contact with the metal contacts 21. In this way, the region 23 which extends through the layer 14 between the two dopant regions 20 forms a resistive heater which is adjacent the waveguide 15 and positioned immediately below it so as to provide effective heat transfer into the waveguide region. The doped regions are placed at sufficient distance from the edges of the waveguide region to avoid significant optical loss due to interaction of the optical mode with the doped regions.

In use, t he two metal contacts 21 are connected to opposite polarity terminals one of which is a power supply 26. The power supply 26 may be variable in power output and also arranged to provide a modulated power output when required. The passage of current from the power supply 26 through the resistive heater 23 will cause the temperature of the silicon in the waveguide 15 to change and thereby alter the refractive index of the silicon and cause a phase change in light transmitted along the waveguide 15.

Figure 3:
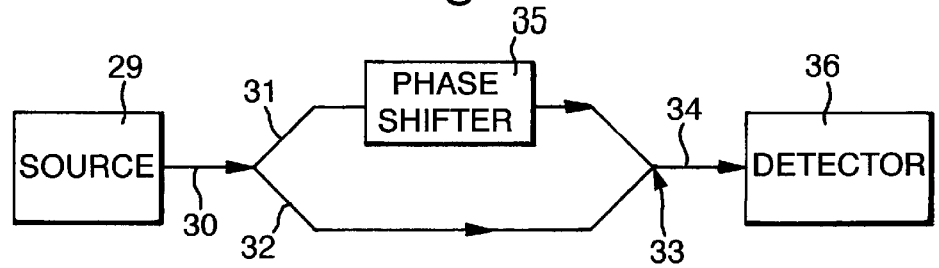
FIG. 3 shows schematically the use of a device of the type shown in FIGS. 1 and 2 in a light modulating system.

When such a device is used in a light modulator, a single beam from a light source may be split as shown schematically in FIG. 3. In this case, light from a source 29 passes through a waveguide 30 which is split into two separate waveguides 31 and 32. Waveguide 32 leads directly to a junction 33 at an output waveguide 34. However, waveguide 31 passes through a phase shifter 35 before reaching junction 33. The phase shifter 35 may be a device of the type as shown in FIGS. 1 and 2. The output beam in waveguide 34 may be supplied to a destination requiring a modulated light beam or may reach a detector 36 as shown in FIG. 3.

Figure 4:
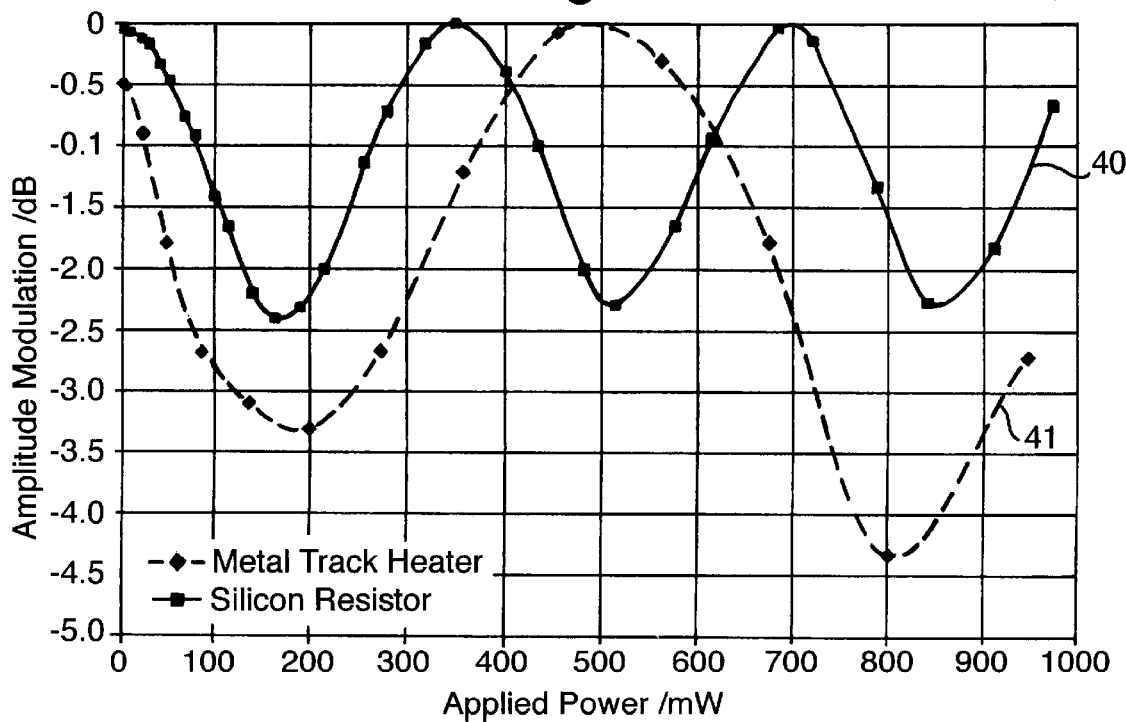
FIG. 4 is a graph showing one aspect of performance of the device of FIG. 1 in comparison with a prior art device and FIG. 5 is a graph showing a different aspect of performance of the device of FIG. 1 in comparison with a prior art device.

FIG. 4 shows in the curve indicated by a solid line 40 the amplitude modulation in dB which m ay be achieved for varying applied power from the power supply 26 as a result of using the device of FIG. 1 in a light modulator circuit of the type shown in FIG. 3. In order to achieve transition from a maximum light output to a minimum light output, it can be seen that the change in power applied through the resistive heater 23 is of the order of 150 mW. For an equivalent prior art device having a metal track heater placed over the waveguide 15, the power necessary to achieve equivalent amplitude modulation is shown by the broken line 41 in FIG. 4. It can be seen from this that a power change of approximately 300 mW is required to vary the light output between a maximum and a minimum value. It can therefore be seen that the use of the resistive heater 23 within the semiconductor layer 14 has much improved efficiency in achieving amplitude modulation due to the heat being generated within the waveguide structure rather than on top of the structure.

Figure 5:
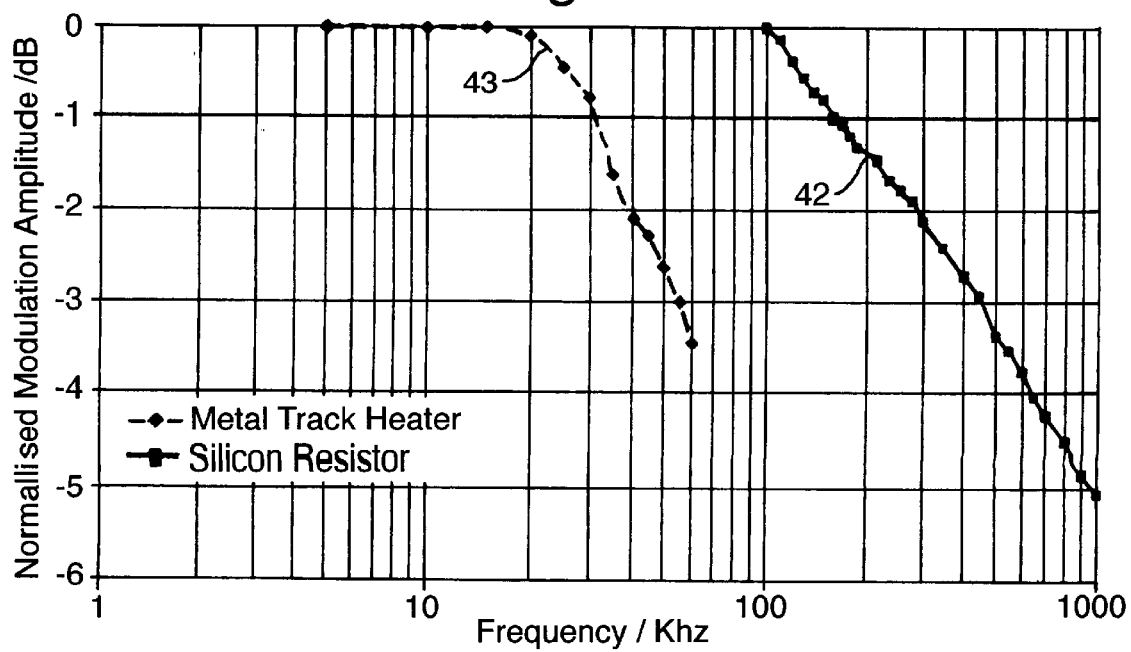

FIG. 5 shows the modulation amplitude in dB, normalised with respect to the low frequency limit, with variation in frequency in kHz for the device of FIG. 1 in comparison with a prior art device using a metal track heater over the waveguide. It will be appreciated that as the power supply 26 is modulated, the optical response of the phase shifting will depend on the frequency of modulation. The graph shown in solid lines and marked 42 indicates the performance of a device as shown in FIG. 1. This indicates that up to a frequency of 100 kHz there is no decrease in the normalised modulation amplitude. The frequency by which the modulated amplitude has fallen to −3 dB is approximately 450 kHz, thereby indicating a bandwidth of 450 kHz. The performance of the prior art device using a metal track of the waveguide is shown by the broken line 43. This indicates that the modulation amplitude has fallen to −3 dB at approximately 55 kHz, thereby indicating a bandwidth of only 55 kHz.

The results shown in FIGS. 4 and 5 represent those achieved using a Mach-Zehnder interferometer.

It will be understood that the operation of the device is dependent on the drive frequency of the power supply 26. In addition to generating heat within the silicon, it is necessary to provide thermal conduction away from the waveguide region and the doped regions 20 in combination with the metal contacts 21 provide a region of higher thermal conductivity to give improved conduction away from the waveguide and thereby improve high frequency performance.

In any particular embodiment, a balance may be achieved between achieving an efficient modulator which requires the minimum applied power for a given phase shift, e.g. $\pi$ radians, and maximising the modulation bandwidth by removing the applied heat as quickly as possible from the waveguide region.

The present invention is not limited to the details of the foregoing example. For instance, the doped regions 20 may be located at other positions within the silicon structure. Three or more doped regions may be used to form a more complex structure. The dopant type used, the concentration of dopant and the width and depth of the doped regions can be varied and used to control the balance between efficient modulation and a high modulation bandwidth.

What is claimed is:

1. A thermo-optic semiconductor device comprising one semiconductor region providing an optical transmission path and an adjacent semiconductor region providing a resistive semiconductor heat generator between two doped regions, said doped regions being in electrical contact with external contact regions so that current may be passed through the resistive semiconductor heat generator within the adjacent semiconductor region to heat said one semiconductor region and thereby vary optical transmission by said one semiconductor region.

2. A thermo-optic electric device according to claim 1 in which said external contact regions comprise metal region.

3. A device according to claim 2 which is covered with an electrically insulating layer and said metal regions are exposed through said insulating layer.

4. A device according to claim 1 in which the resistive heater provides a phase shifter for light transmitted through the transmission path.

5. A device according to claim 1 in which the semiconductor device comprises a semiconductor waveguide providing said optical transmission path and said adjacent semiconductor region extends a cross the underside of the waveguide.

6. A device according to claim 1 in which the semiconductor regions are formed of silicon.

7. A device according to claim 1 in which the device is integrated on a silicon or silicon-on-insulator chip.

8. A device according to claim 1 in which the doped regions each comprise P-typed doped regions within the semiconductor.

9. A device according to claim 1 in which the doped regions each comprise N-typed doped regions within the semiconductor.

10. A light modulator comprising an optical transmission device for splitting an optical beam and directing part of the optical beam through a thermo-optic device to cause a phase variation, said thermo-optic semiconductor device comprising one semiconductor region providing an optical transmission path and an adjacent semiconductor region providing a resistive semiconductor heat generator between two doped regions, said doped regions being in electrical contact with external contact regions so that current may be passed through the resistive semiconductor heat generator within the adjacent semiconductor region to heat said one semiconductor region and thereby vary refractive index in said one semiconductor region and an optical beam recombiner for recombining the beam to cause amplitude modulation by interference.

* * * * *